US011762649B2

(12) United States Patent
Liao et al.

(10) Patent No.: US 11,762,649 B2
(45) Date of Patent: Sep. 19, 2023

(54) INTELLIGENT GENERATION AND MANAGEMENT OF ESTIMATES FOR APPLICATION OF UPDATES TO A COMPUTING DEVICE

(71) Applicant: Microsoft Technology Licensing, LLC, Redmond, WA (US)

(72) Inventors: Yutong Liao, Seattle, WA (US); Cheng Wu, Chengdu (CN); Nicolas Justin Lavigne, Bellevue, WA (US); Frederick Douglass Campbell, Lynnwood, WA (US); Chan Chaiyochlarb, Bellevue, WA (US); Raymond Duane Parsons, Black Diamond, WA (US); Alexander Oot, Seattle, WA (US); Paul Luo Li, Redmond, WA (US); Minsuk Kang, Redmond, WA (US); Abhinav Mishra, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 93 days.

(21) Appl. No.: 17/363,666

(22) Filed: Jun. 30, 2021

(65) Prior Publication Data
US 2022/0350588 A1 Nov. 3, 2022

Related U.S. Application Data

(60) Provisional application No. 63/182,302, filed on Apr. 30, 2021.

(51) Int. Cl.
*G06F 8/65* (2018.01)
*G06N 3/08* (2023.01)
(Continued)

(52) U.S. Cl.
CPC ................ *G06F 8/65* (2013.01); *G06F 9/542* (2013.01); *G06F 18/217* (2023.01); *G06N 3/08* (2013.01); *G06N 20/00* (2019.01); *G06V 10/768* (2022.01)

(58) Field of Classification Search
CPC ....... G06F 8/60–66; G06F 9/542; G06N 3/08; G06V 10/768; G06K 9/6262
(Continued)

(56) References Cited

U.S. PATENT DOCUMENTS 10,949,252 B1   3/2021  Krishnamurthy et al.
2013/0179877 A1  7/2013  Dain
(Continued)

OTHER PUBLICATIONS

Weiss, Cathrin, et al., How Long will it Take to Fix This Bug?, Fourth International Workshop on Mining Software Repositories, 2007, 8 pages, [retrieved on Apr. 26, 2023], Retrieved from the Internet: <URL:http://ieeexplore.ieee.org/>.*

(Continued)

*Primary Examiner* — Geoffrey R St Leger

(57) ABSTRACT

The present disclosure is directed to automated generation and management of update estimates relative to application of an update to a computing device. One or more updates to be applied to a computing device are identified. A trained artificial intelligence (AI) model is applied that is adapted to generate an update estimate predicting an amount of time that is required to apply an update to the computing device. An update estimate is generated based on a contextual analysis that evaluates one or more of: parameters associated with the update; device characteristics of the computing device to be updated; a state of current user activity on the computing device; historical predictions relating to prior update estimates for one or more computing devices (e.g., that comprise the computing device); or a combination
(Continued)

thereof. A notification of the update estimate is then automatically generated and caused to be rendered.

20 Claims, 7 Drawing Sheets

(51) Int. Cl.
*G06F 9/54* (2006.01)
*G06V 10/70* (2022.01)
*G06F 18/21* (2023.01)
*G06N 20/00* (2019.01)

(58) Field of Classification Search
USPC .................................................. 717/168–178
See application file for complete search history.

(56) References Cited

U.S. PATENT DOCUMENTS

| | | | |
|---|---|---|---|
| 2017/0060385 A1* | 3/2017 | Goldsmith | G06F 3/0486 |
| 2017/0235561 A1 | 8/2017 | Butler et al. | |
| 2018/0129492 A1 | 5/2018 | Singh et al. | |
| 2020/0364113 A1 | 11/2020 | Tormasov et al. | |
| 2021/0004000 A1* | 1/2021 | Kalaskar | G06F 9/45545 |
| 2022/0164645 A1* | 5/2022 | Zaina | G06F 21/57 |

OTHER PUBLICATIONS

Shukla, Ruchi, et al., Estimating Software Maintenance Effort—A Neural Network Approach, ISEC '08: Proceedings of the 1st India software engineering conference, 2008, 6 pages, [retrieved on Apr. 26, 2023], Retrieved from the Internet: <URL:http://dl.acm.org/>.*

"International Search Report and Written Opinion Issued in PCT Application No. PCT/US22/023754", dated Jul. 22, 2022, 15 Pages.

"LightGBM's", Retrieved from: https://web.archive.org/web/20210220001516/https:/lightgbm.readthedocs.io/en/latest/, Feb. 20, 2021, 2 Pages.

Li, et al., "Evolving software to be ML-driven Utilizing Real-world A/B Testing: Experiences, Insights, Challenges", In Proceedings of International Conference on Software Engineering, Retrieved Date: Apr. 6, 2021, 10 Pages.

Mackie, Kurt, "How Microsoft uses Machine Learning to Improve Windows 10 Upgrades", Retrieved from: https://rcpmag.com/articles/2019/09/27/machine-learning-windows-10-upgrades.aspx, Sep. 27, 2019, 11 Pages.

Rahrig, Clarke, "GPU accelerated ML training inside the Windows Subsystem for Linux", Retrieved from: https://blogs.windows.com/windowsdeveloper/2020/06/17/gpu-accelerated-ml-training-inside-the-windows-subsystem-for-linux/, Jun. 17, 2020, 7 Pages.

Smith, Russell, "How Microsoft Uses Machine Learning to Improve Windows 10 Update Experience", Retrieved from: https://petri.com/how-microsoft-uses-machine-learning-to-improve-windows-10-update-experience, Oct. 30, 2019, 14 Pages.

Zhang, et al., "Model-Centric Computation Abstractions in Machine Learning Applications", In Proceedings of the 3rd ACM SIGMOD Workshop on Algorithms and Systems for MapReduce and Beyond, Jun. 26, 2016, 4 Pages.

* cited by examiner

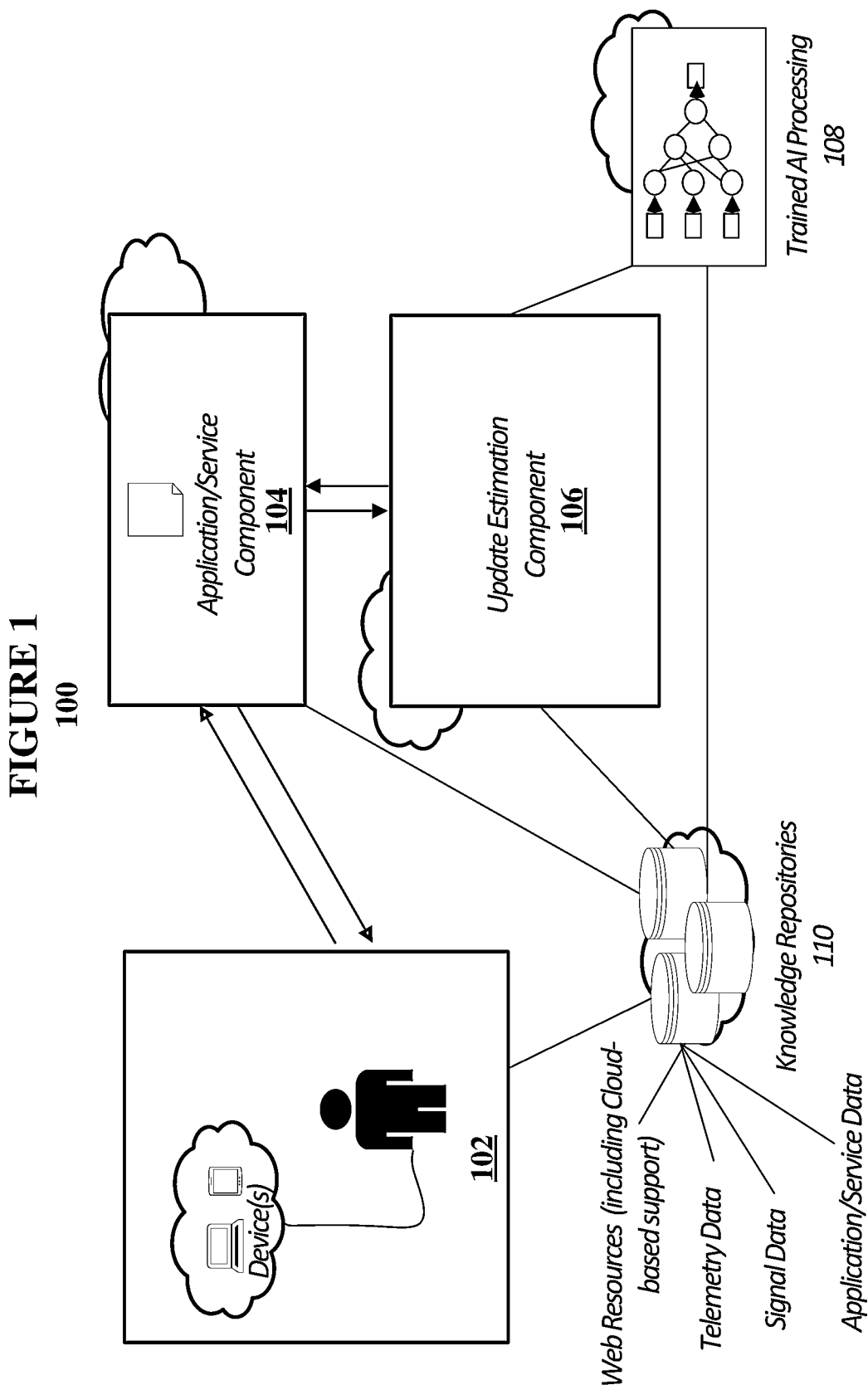

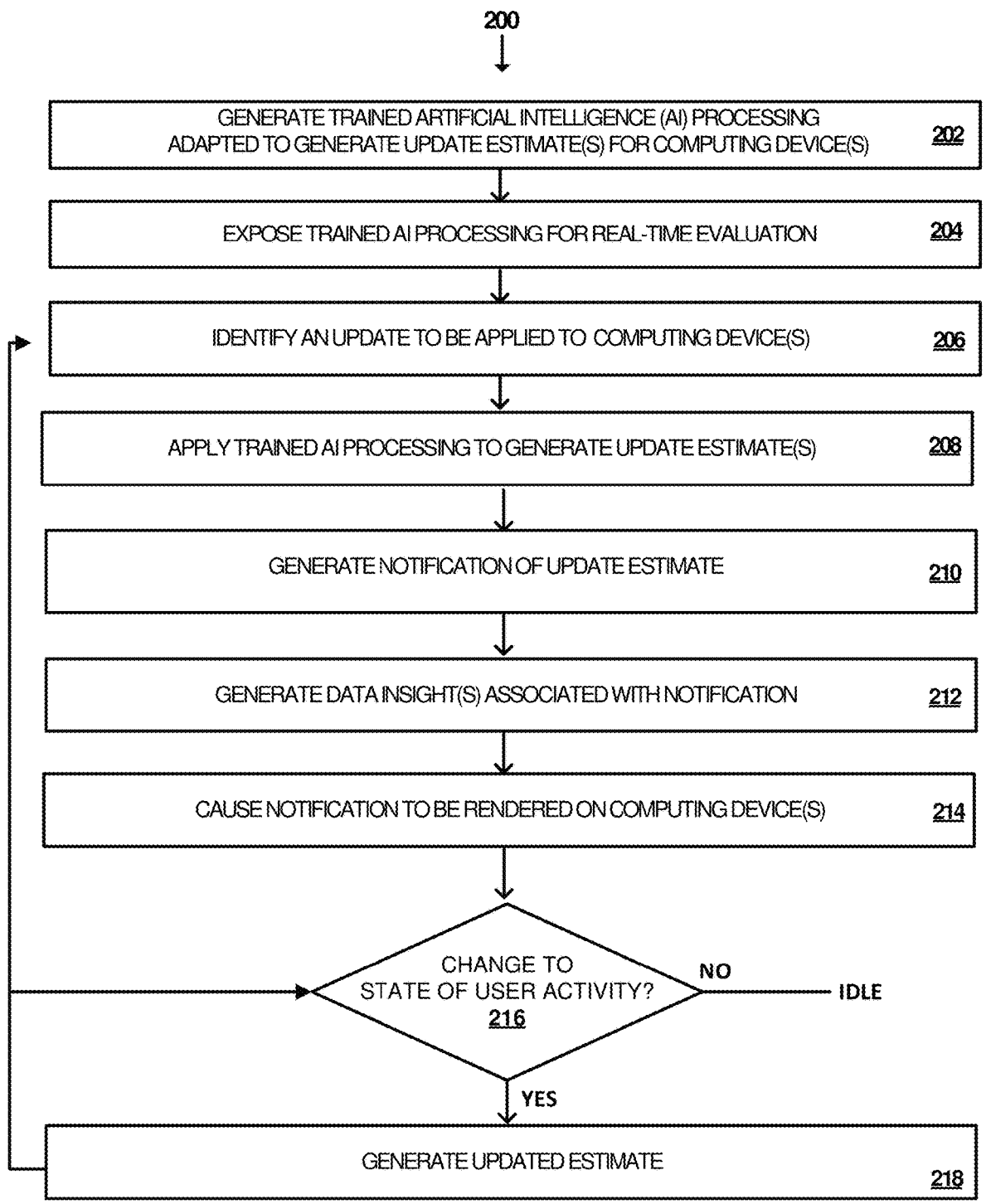

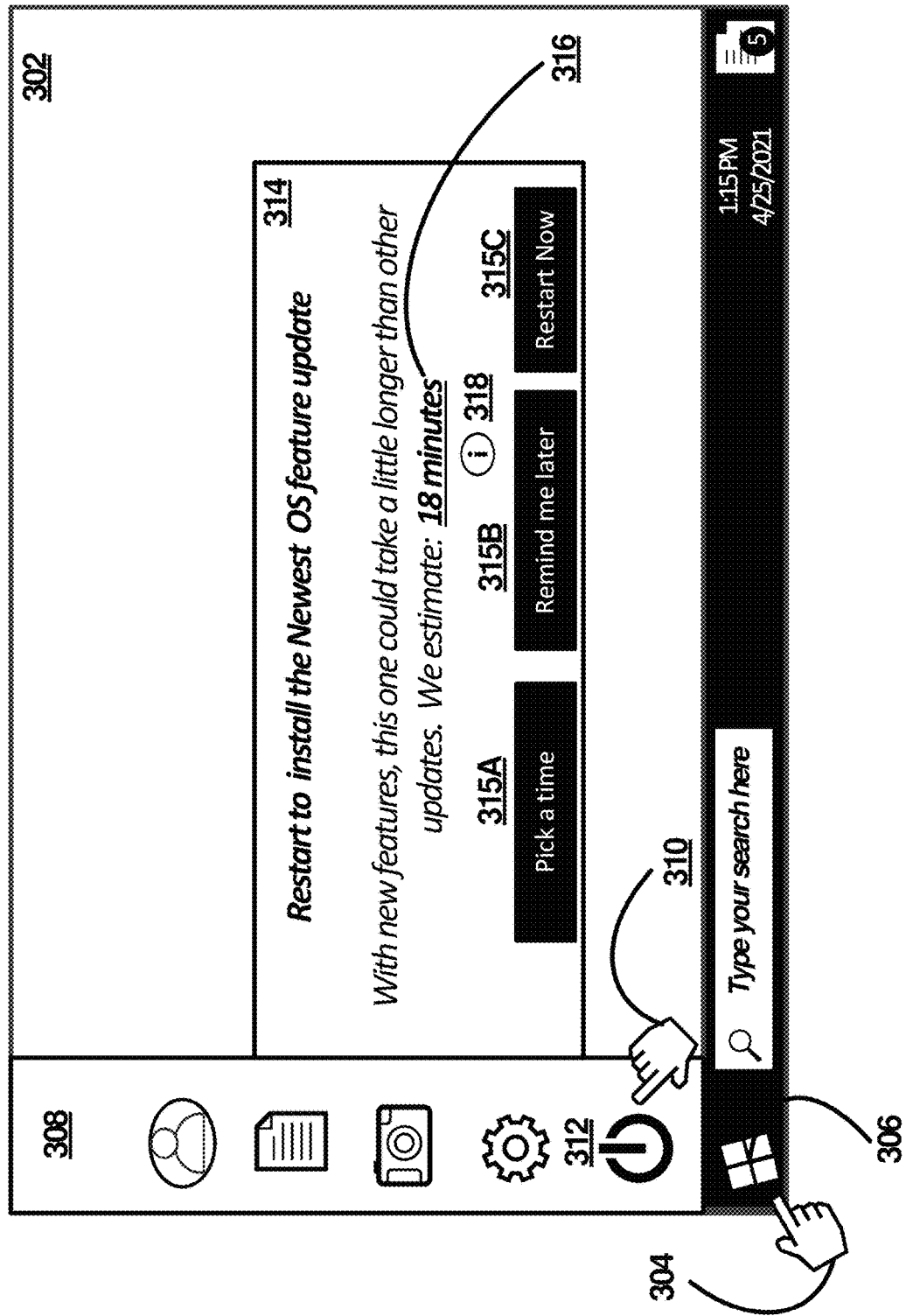

320

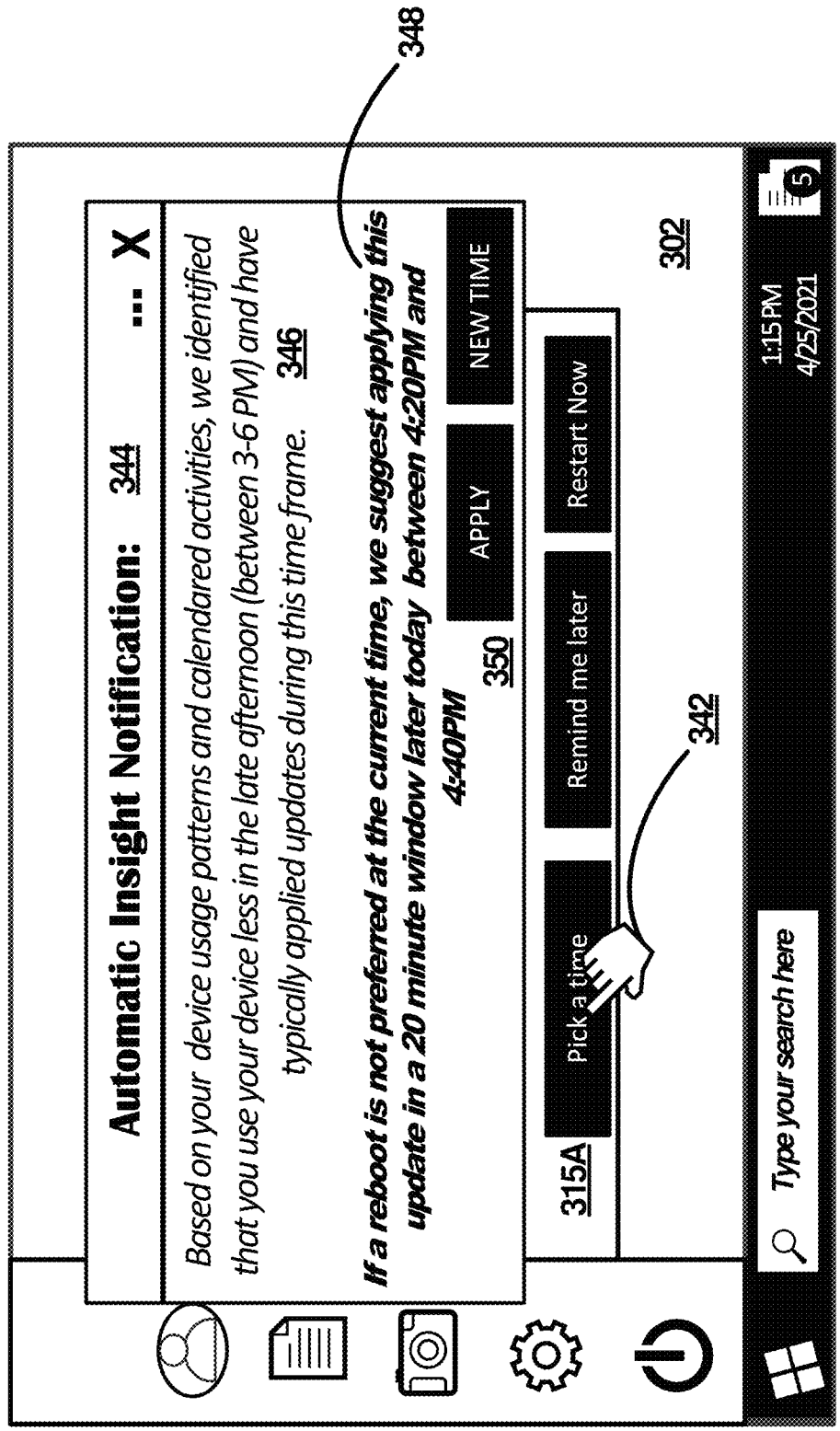

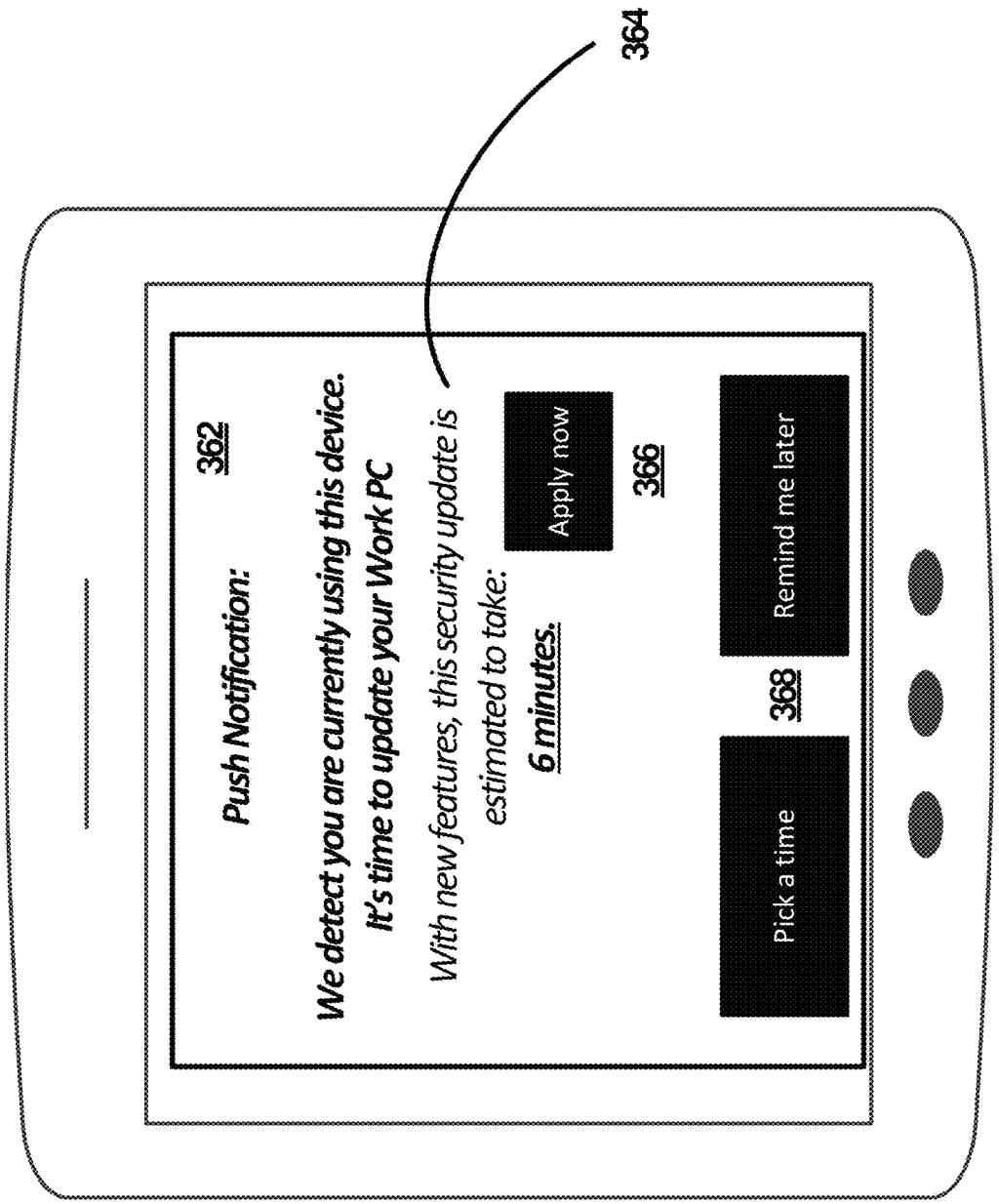

INTELLIGENT GENERATION AND MANAGEMENT OF ESTIMATES FOR APPLICATION OF UPDATES TO A COMPUTING DEVICE

CROSS REFERENCE TO RELATED PATENT APPLICATIONS

This application is a non-provisional application that claims priority to U.S. Provisional Patent Application No. 63/182,302 entitled "INTELLIGENT GENERATION AND MANAGEMENT OF REBOOT ESTIMATES FOR APPLICATION OF UPDATES TO A COMPUTING DEVICE", filed on Apr. 30, 2021, which is hereby incorporated by reference herein, in its entirety.

BACKGROUND

Determining when to apply an update to a computing device presents numerous challenges. Traditionally, operating systems (OS), applications/services, etc., may inform a user what updates are to be applied but do not tell the user how long it will take to apply an update. Not knowing how long an update and associated restart could take reduces user certainty about the usability of their devices and causes frustration.

Moreover, conventional estimates of wait times for software download or update installations (e.g., progress bars) are often either artificial (just to provide a sense of progress) or based on heuristics (e.g., "each download file adds 3 minutes").

Contextual data pertaining to a state of a computing device may be ignored or inefficiently managed when automatically applying a conventional update. If a user continuously puts off an update, an OS may automatically apply the update without considering the context that the user was working in. If the user leaves his device on overnight with important files open, numerous operations must be executed to automatically save individual files, and extra storage resources are often necessary to enable autosaving of files. Additionally, an order and arrangement of content from a prior context may not be easily recreated for a user after an update restart. While documents may be automatically saved and reopened upon automatic restart, the collective arrangement of those documents on a display is not easily recreated. Users may have to re-launch certain applications and rearrange files to a state of prior use.

SUMMARY

For resolution of the above identified limitations and other reasons, the present disclosure is directed to automated generation and management of estimates for application of one or more updates to a computing device. One or more updates are identified that are to be applied to a computing device. A trained AI model adapted to generate an update estimate is applied. An update estimate is a temporal representation predicting an amount of time that is required to apply one or more updates to a computing device including one or more reboots of the computing device (e.g., to apply the update). An exemplary update estimate is generated based on a contextual analysis that evaluates one or more of: parameters associated with the update; device characteristics of the computing device to be updated; a state of current user activity on the computing device; historical predictions relating to prior update estimates for one or more computing devices (e.g., that comprise the computing device); or a combination thereof. A notification (e.g., graphical user interface (GUI) notification) is automatically generated, where the notification comprises: the update estimate and/or contextually relevant data insights pertaining to the update estimate which may be generated based on determinations derived from a trained AI model. An exemplary notification is then caused to be rendered. In some examples, an exemplary notification may be transmitted to a client computing device for rendering. In other examples, an exemplary notification is rendered via a computing device that generated the notification.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary system for enabling automatic generation and management of update estimates relative to one or more updates to be applied to a computing device, with which aspects of the present disclosure may be practiced.

FIG. 2 illustrates an exemplary method related to automatic generation and management of update estimates relative to one or more updates to be applied to a computing device, with which aspects of the present disclosure may be practiced.

FIGS. 3A-3D illustrate exemplary user interface views adapted for management of update estimates relative to one or more updates to be applied to a computing device, with which aspects of the present disclosure may be practiced.

DETAILED DESCRIPTION

Figure 3B:
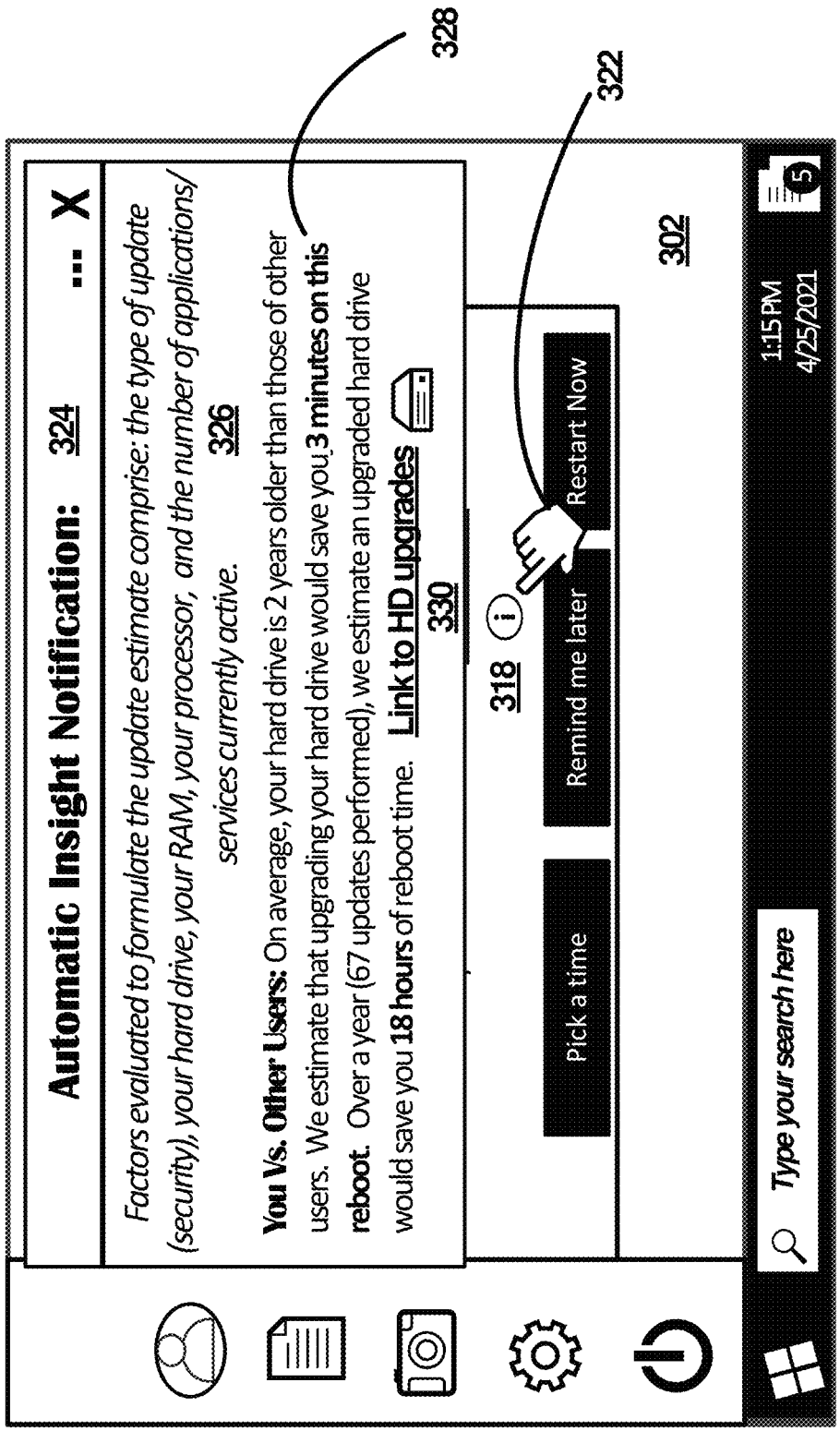

There is a technical need for automated generation and management of update estimates relative to application of an update to a computing device. One or more updates to be applied to a computing device are identified. Non-limiting examples of updates comprise but are not limited to: operating system (OS) feature updates (e.g., new versions of an OS and/or integration of new features into an OS); and updates to applications/services, among other examples. A trained AI model (e.g., machine learning model) is applied that is adapted to generate an update estimate predicting an amount of time that is required to apply the update on the computing device. The AI model is trained based on one or more of the following data types: device data (e.g., retail device data) from a user population of computing devices (e.g., retail computing devices) associated with a software data platform (e.g., executing a specific OS or group of OS iterations); testing device data from computing devices run prior to a full product release; and a corpus of training data comprising feedback on update estimates from prior iterations of the trained AI model. In some examples, the trained AI model is tailored for a specific user such that the trained AI model is customized based on the user engagement, behavior, preferences, etc. of the specific user and/or related users. In another example, the trained AI model is tailored for a group of users, for example, users of a particular geographical location and/or device configuration. In other examples, the trained AI model does not contemplate user-specific data, but is applied based on device configuration data.

An update estimate is a temporal representation predicting an amount of time that is required to apply one or more updates to a computing device including one or more reboots of the computing device (e.g., to apply the update). An exemplary update estimate is generated based on a contextual analysis that evaluates one or more of: update parameters (associated with the update); device characteristics of the computing device to be updated; a state of current user activity on the computing device; historical predictions relating to prior update estimates for one or more computing devices (e.g., that comprise the computing device); or a combination thereof. A plurality of parameters/features are described in the present disclosure that enable generating and providing an accurate update estimate and associated contextual information via GUI notification. In one example, such parameters include update parameters comprising: a type of the update; a size of the update; and/or other update parameters. Alternatively or additionally, the parameters may comprise device parameters indicating: a type of hard drive installed in the computing device; an age of the hard drive installed in the computing device; specifications associated with random access memory (RAM) installed in the computing device; specifications associated with a processor installed in the computing device; and/or other device parameters. Alternatively or additionally, the parameters may include user activity parameters indicating: applications and/or services currently executing on the computing device; a geographical identification of a location of the computing device; and/or other user activity parameters.

Furthermore, a notification (e.g., GUI notification) is automatically generated, where the notification comprises the update estimate. An exemplary notification is presentable through a GUI associated with a computing device, where a GUI may be specific to an OS and/or a host application/service endpoint. In further examples, an exemplary notification comprises one or more data insights providing context for the update estimate (e.g., analysis of determinations from application of a trained AI model). In alternative examples, one or more data insights are generated separately from a notification of an update estimate but are surfaced concurrently therewith. In any example, a data insight provides context for the update estimate, including insight into the determinations generated through application of the trained AI model. In one example, a data insight indicates a rationale for the update estimate, including determinations from applicable parameters, identified by a trained AI model, that were used to predict an amount of time that is required to apply the update on the computing device. An exemplary length of time is a temporal representation (e.g., prediction in minutes and/or seconds) for application of an update to a computing device (including one or more reboots). In other examples, a data insight indicates a user-specific context and/or device-specific context pertaining to a specific user/device. In some examples, the user-specific context and/or device-specific context may be presented relative to other users (e.g., a group of users in a geographical location of that user). Exemplary data insights further provide links to content/resources that may be related to the update estimate. For instance, a link to computing device upgrades can be provided to a user wherein the upgrades would improve efficiency in application of an update. In even further examples, data insights are generated that are derived from analysis of device usage patterns (e.g., of a computing device or group of computing devices), where suggestions can be provided to a user as to when to apply an update relative to the update estimate. For instance, if an update estimate predicts that application of an update will take ten minutes, a ten-minute window may be suggested to the user based on analysis of device usage patterns (e.g., for a user or group of users). Trained AI processing is further usable to generate suggested time windows for applying an update based on contextual analysis that comprises analysis of device usage (e.g., historic usage patterns and/or current usage).

In some examples, trained AI processing is executed in a distributed manner using resources that are separate from the computing device that is to be updated. In such technical instances, an exemplary notification is then transmitted to the computing device for rendering. In examples where data insights are executed separately from the notification of the update estimate, data insights are also transmitted to the computing device for rendering.

In alternative examples, a trained AI model is stored and executed on a computing device in which an update is to be applied. In such technical instances, the notification and/or the contextual data insights are rendered in a GUI (e.g., of an application/service) that is presented via a computing device (or peripheral display device). An exemplary notification may be presented inline with OS content and/or presented through a GUI of a host application/service endpoint. Inline, as referenced in the present disclosure, is intended to refer to technical instances where data is embedded as a content portion (e.g., data object), among other content portions, that is displayable within a rendering of OS content (OS GUI) or GUI of a host application/service endpoint. Non-limiting examples of notifications and/or data insights presented inline are illustrated in FIGS. 3B-3D. In further examples, notifications and/or data insights are propagated to other computing devices. For instance, a notification comprising an update estimate is propagated to another computing device registered to a user account associated with a user of the computing device. Trained AI processing is further usable to generate determinations for propagation of notifications (e.g., push notifications) to user computing devices, where users can remotely control content associated with an update estimate as well as a state of update to another computing device.

Additionally, the trained AI model is configured to provide real-time (or near real-time) analysis to continuously or periodically update the update estimate. For instance, user engagement with a computing device can impact the time an update takes to occur, thereby affecting an update estimate. In one example, a change to the state of current user activity of the computing device is detected. In response, an updated estimate (e.g., second update estimate) is generated, using the trained AI model. The updated estimate is then caused to be rendered, for example, by being presented via a computing device or transmitted to the computing device for rendering.

Exemplary technical advantages provided by processing described in the present disclosure comprise but are not limited to: efficiently and accurately improving predictions for computing device downtime when applying updates;

improved accuracy in generating update estimates; improved processing efficiency (e.g., reduction in processing cycles, saving resources/bandwidth) for computing devices when generating update estimates and associated notifications; reduction in latency through efficient processing operations that improve correlation of parameters when applying a trained AI model to generate an update estimate; visibility of update estimates across different devices and/or different host application/service endpoints and the ability to control updates from such different devices and/or host applications or services; and improving usability of a computing device and an associated OS, thereby improving user experience, among other technical advantages.

FIG. 1 illustrates an exemplary system 100 for enabling automatic generation and management of update estimates relative to one or more updates to be applied to a computing device, with which aspects of the present disclosure may be practiced. As an example, components illustrated in system 100 may be executed by an exemplary computing system 401 (or multiple computing systems) as described in reference to FIG. 4. System 100 includes components that may be utilized to execute processing operations described in method 200 (FIG. 2) as well as processing illustrated by user interface views of FIGS. 3A-3D and the accompanying description. Moreover, interactions between components of system 100 may be altered without departing from the spirit of the present disclosure. Exemplary components illustrated in system 100 may include hardware and/or software components, which are programmed to execute processing operations described herein. In some examples, components of system 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations associated with system 100 may be implemented by one or more components connected over a distributed network, where a user account may be associated with a specific profile established through a distributed software platform. System 100 comprises user computing device(s) 102; an application/service component 104; an update estimation component 106; a component for implementation of trained AI processing 108; and knowledge repositories 110. In the visual representation of system 100, each component is illustrated as corresponding with an individual cloud. This visualization is provided to represent that each component of system 100 may be executing in a distributed manner relative to other components of system 100.

System 100 comprises user computing device(s) 102 (e.g., client computing device). An example of a user computing device 102 is a computing system (or computing systems) as described in the description of FIG. 4. In some examples, one or more updates may be applied to a user computing device 102, for example, through execution of an OS. Types of updates that can be applied to a computing device are known to one skilled in the field of art. Non-limiting examples of updates comprise but are not limited to: OS feature updates (e.g., new versions of an OS and/or integration of new features into an OS); and updates to applications/services, among other examples. In alternative examples, a user computing device 102 may be one or more computing devices of a software data platform that are used by developers to execute processing for training exemplary AI processing and/or applying trained AI processing to generate update estimates for other user computer devices.

For instance, one or more user computing devices 102 may be adapted to execute processing operations of the update estimation component 106 and/or a component for implementation of trained AI processing 108.

Additionally, examples of user computing devices 102 comprise any computing device associated with a user account (e.g., of a distributed software data platform). In some technical instances, multiple user computing devices 102 are associated with a user account, where exemplary update estimate notifications can be propagated to multiple user computing devices simultaneously. In other examples, user accounts may refer to user login data associated with an OS of a computing device. For instance, multiple user profiles may be associated with a user computing device, where different representations of an OS may be configured for each individual user profile.

The application/service component 104 comprises one or more computer components (hardware, software or a combination thereof) configured to manage operation of an OS as well as host applications/services and associated endpoints executing thereon. As previously referenced, the application/service component 104 interfaces with other computer components of system 100 to enable management of presentation of exemplary notifications in a contextually relevant manner, for example, inline with content of an OS and/or a specific host application/service endpoint. Inline, as referenced in the present disclosure, is intended to refer to technical instances where data is embedded as a content portion (e.g., data object), among other content portions, that is displayable within a rendering of OS content (OS GUI) or GUI of a host application/service endpoint. Non-limiting examples of notifications and/or data insights presented inline are illustrated in FIGS. 3B-3D.

The application/service component 104 further manages presentation of a GUI usable to present an exemplary notifications and foster user interaction therewith. A host application/service is configured to enable execution of tasks by one or more user accounts. Non-limiting examples of host applications/services that are applicable in the present disclosure comprise but are not limited to: open-source collaborative framework applications/services; video conferencing applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping applications/services; calendaring applications/services; electronic payment applications/services; digital data storage or distributed data storage applications/services; web conferencing applications/services; call communication applications/services; language understanding applications/services; bot framework applications/services; networking applications/services; social networking applications/services; educational applications/services; and suites of applications/services that may collectively comprise a combination of one or more of the previously mentioned applications/services, among other examples. The application/service component 104 further manages respective endpoints associated with individual host applications/services, which have been referenced in the foregoing description. In some examples, an exemplary host application/service may be a component of a distributed software data platform providing a suite of host applications/services and associated endpoints. A (distributed) software data platform is configured to provide access to a plurality of applications/services, thereby enabling cross-application/service usage to enhance functionality of a specific application/service at run-time. For instance, a software platform enables interfacing between an OS of user computing device(s) 102 and host applications/services accessed therethrough. Distributed software data platforms may further manage tenant configurations/user accounts to manage access to features, applications/services, etc., as well access to distributed data storage (including user-specific distributed data storage). Moreover, specific host applications/services (including those of a distributed software platform) may be configured to interface with other non-proprietary application/services (e.g., third-party applications/services) to extend functionality including data transformation and associated implementation.

The application/service component 104 is further configured to present, through interfacing with other computer components of system 100, an adapted GUI that provides user notifications, GUI menus, GUI features, etc., related to the provision of update estimates and/or associated data insights. This may include automatic update of components through GUI features/elements that are presented without a user having to take manual action to request the update. In other instances, an application command control (e.g., user interface ribbon and/or GUI menu) may be adapted to include selectable user interface features related to management of notifications. For instance, GUI features may be automatically generated and presented to bring attention to message notifications and associated content as well as action taken, such as automatically applying updates to computing devices. Non-limiting visual examples of an improved GUI, and GUI elements provided therein, are provided in FIGS. 3A-3D.

The update estimation component 106 comprises one or more computer components (hardware, software or a combination thereof) configured to execute and manage processing operations related to generation and provision of notifications of exemplary update estimates (and associated data insights). In some examples, the update estimation component 106 may be a distributed computing device (e.g., distributed server device) that executes processing asynchronously from a user computing device 102 receiving a notification and/or being updated. In other examples, the update estimation component 106 may be configured as a computing component (hardware, software or a combination thereof) that executes on the user computing device 102 that is receiving the notification and/or being updated. In alternative examples, the update estimation component 106 is a system of components that execute across one or more server devices and one or more components executing on a computing system, where a network connection is usable to connect the components in a system configuration. The update estimation component 106 may be configured to execute any processing operations described herein, including those described relative to method 200 (FIG. 2), and those associated with user interface diagrams of FIGS. 3A-3D and the accompanying description.

As indicated in the foregoing, a component for implementation of trained AI processing 108 may be applied to generate any determinations used to create an update estimate or associated data insights. An exemplary component for implementation of trained AI processing 108 may manage AI modeling including the creation, training, application, and updating of AI modeling. In cases where trained AI processing is applied, general application of trained AI processing including creation, training and update thereof is known to one skilled the field of art. Trained AI processing may be adapted to execute specific determinations described herein with reference to any component of system 100 and processing operations executed thereby. For instance, AI modeling may be specifically trained and adapted for execution of processing operations comprising but not limited to: data collection including collection of: device data (e.g., retail device data) from a user population of computing devices (e.g., retail computing devices) associated with a software data platform (e.g., executing a specific OS or group of OS iterations); testing device data from computing devices run prior to a full product release; a corpus of training data comprising feedback on update estimates from prior iterations of the trained AI model; identification of parameters for generation of update estimates by a trained AI model as well as correlation of parameters usable to generate update estimates; labeling of parameters for generation of update estimates; executing of sanitization and clipping of data to tailor a data distribution that is representative of devices across a user population; hyperparameter tuning of identified parameters associated with generating an update estimate; selection of applicable trained AI models, from a plurality of applicable trained AI models, for contextually relevant analysis; generation of data insights pertaining to update estimates; generating notifications (e.g., GUI notifications) comprising update estimates and/or related data insights; execution of relevance scoring/ranking analysis for generating data insights including insights for suggesting alternative time frames to apply updates relative to an update estimate; and determinations as to how to propagate notifications across different user computing devices, among other examples.

Exemplary AI processing may be applicable to aid any type of determinative or predictive processing by any components of system 100, via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM); neural networks (e.g., convolutional neural network (CNN) or recurrent neural network (RNN)); and transformers, among other examples. Non-limiting examples of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting examples of semi-supervised learning that may be applied comprise but are not limited to: assumption determination processing; generative modeling; low-density separation processing and graph-based method processing, among other examples. Non-limiting examples of reinforcement learning that may be applied comprise but are not limited to: value-based processing; policy-based processing; and model-based processing, among other examples. Furthermore, a component for implementation of trained AI processing 108 may be configured to apply a ranker to generate relevance scoring to assist with any processing determinations with respect to any relevance analysis described herein.

Exemplary trained AI processing further extends to examples where different trained AI models may be generated and implemented in different contextual scenarios. For instance, a trained machine learning model is adapted to execute processing for generation of update estimates. Training of AI processing (e.g., a trained machine learning model) can yield parameters (or groups of parameters) for the most accurate generation of update estimates, where a trained machine learning model can execute analysis to evaluate contextual scenarios and determine a realistic update estimate. A machine learning model is adapted, above what is traditionally known, to generate update estimates. Among other factors, device configuration (e.g., one or more of hard drive type, RAM, processor) and/or geographical location data of a device/user may be evaluated and correlated to select a specific version of a trained AI model to apply. In some examples, a trained AI model is tailored for a specific user such that a machine learning model is customized for evaluating a specific user device configuration of a specific user and/or related user engagement, behavior, preferences, etc. In another example, a trained AI model is tailored for a group of users, for example, users of a particular geographical location and/or device configuration. In other examples, an exemplary trained AI model does not contemplate user-specific data but is applied based on device configuration data. As such, a plurality of trained AI models may be generated and selectively applied based on analysis of one or more parameters identified herein and/or types of signal data subsequently described.

An update estimate is a temporal representation predicting an amount of time that is required to apply one or more updates to a computing device including one or more reboots of the computing device (e.g., to apply the update). An exemplary update estimate is generated based on a contextual analysis that evaluates one or more of: parameters associated with the update; device characteristics of the computing device to be updated; a state of current user activity on the computing device; historical predictions relating to prior update estimates for one or more computing devices (e.g., that comprise the computing device); or a combination thereof. Said contextual analysis helps provide a more realistic temporal representation of an update estimate, as compared with traditional methods of estimation, by evaluating the various parameters previously described. Furthermore, a more realistic update estimate helps users understand computing device downtime and plan their schedule accordingly. Downtime is a measure from the time a computing device is shut down to the time the computer has completed a reboot and a log-in screen is provided enabling a user to login.

To adapt AI processing for generation of update estimates, among other determinations, number processing operations are executed comprising processing operations for: data collection; data labeling; training; hyperparameter tuning; and evaluation/re-training. Such processing is used to generate trained AI modeling that satisfies precision and accuracy thresholds set by developers. Accuracy of trained modeling may vary based on different device characteristics. For instance, modeling of the present disclosure that focuses on device-specific characteristics can achieve highly accurate temporal predictions for update estimates. In embodiments, trained modeling achieves high accuracy in predicted update estimates above ninety-five (95) percent when computing devices have a solid-state drive (SSD) drive to which the update is applied, and above seventy-eight (78) percent when computing devices have a hard disk drive (HDD) to which the update is applied. Additional parameters and/or signal data described herein are also considered in a contextual analysis to help improve accuracy of trained modeling, where the metrics provided above pertaining to accuracy of a trained AI model can be further improved through a more comprehensive signal data analysis. Moreover, as a trained AI model is a learning model, accuracy can improve over time through iterations of training, receipt of feedback (e.g., user feedback as to the accuracy of update estimates), etc.

With respect to data collection, telemetric analysis is applied to ingest data to adequately train an AI model. Data ingestion processing for building of trained AI processing is known to one skilled in the field of art. Above what is traditionally known, specific data types are collected for the trained AI model to build a rich model for generating a update estimate. As previously identified, the AI model is trained based on one or more of the following data types: device data (e.g., retail device data) from a user population of computing devices (e.g., retail computing devices) associated with a software data platform (e.g., executing a specific OS or group of OS iterations); testing device data from computing devices run prior to a full product release; and a corpus of training data comprising feedback on update estimates from prior iterations of the trained AI model. Retail device data is intended to cover technical instances where data analyzed for generation of an update estimate is obtained from registered users' devices that have been commercially distributed (e.g., to users of a software data platform). Using retail device data ensures that an AI model is trained based on real downtime for application of one or more updates as applied to user computing devices thereby reflecting a real-world distribution to generate the most accurate update estimates. However, it is to be recognized that parameters can be analyzed for any type of device and is not limited to those that were commercially distributed for usage with a software data platform.

It is to be recognized that user-specific data (e.g., retail device data and/or user activity data from usage of devices and/or applications/services) is stored (and accessed) in compliance with privacy laws and regulations. That is, user data collected (and further analyzed by a trained AI model) is done so in compliance with privacy laws and regulations. Data is retained only as long as necessary, available for inspection, and correctable by users. In some technical instances, users may consent to having user-specific data accessed to improve their user experience and/or operation of an OS and associated applications/services. In such technical instances, trained AI modeling may incorporate user-specific parameters and/or signal data in its contextual analysis. Furthermore, exemplary modeling is trained and executed in a privacy compliant manner, where developers may never see/access user-specific data due to compliance requirements/restrictions. Moreover, data is retained in compliance with data retention policies and regulations.

In some examples, labeled data is prepared for the trained AI model. In one example, supervised learning is executed through a developer platform. Processing for data labeling and execution of supervised learning are known to one skilled in the field of art. Above what is traditionally known, a list of parameters is defined which adapts the AI model for a specific purpose related to generation of an update estimate. Non-limiting examples of parameters that may be labeled and used for contextual analysis by trained AI modeling to generate determinations described herein comprise but are not limited to: number of driver updates to install one or more updates (including one or more reboots); download size of one or more updates (e.g., including cumulative updates); total size (in bytes) of pending updates (e.g., reboot drivers); number of other updates; number of reboots required; total size (in bytes) of updates to apply; original equipment manufacturer of disk drives; original equipment manufacturer for processor; total physical RAM (e.g., in GB); processor clock speed; free disk space (e.g., in bytes) of primary and/or secondary disk devices; geographical and/or locational information; usage history of device (e.g., used daily, weekly, monthly); whether device is connected to power source; how often device is connected to power source; number of days since device is bought and/or setup; hour of day; day of week; number of unique applications/services active/in focus (e.g., within a predetermined time threshold (e.g., 60 seconds)); number of user inputs processed in a predetermined time frame (e.g., last 60 seconds); ratio evaluation of user input (i.e., more or less user input over a predetermined period of time); sizing and layout of applications/services being executed prior to reboot; and/or basic input/output system (BIOS) context data for computing device, among other examples. In some examples, different AI models may be tuned to evaluate different types/categories of parameters. In further examples, training processing may identify a list of prioritized parameters, for example, parameters that are identified as highly relevant to generating accurate update estimates or other types of determinations. For example, a lightweight version of a trained AI model (e.g., machine learning model) may focus only on specific targeted parameters, to improve efficiency in execution of trained AI processing. Non-limiting examples of exemplary targeted parameters comprise but are not limited to primary disk type; age of disk/device; processing capabilities of a computing device; and/or number of applications/services, processes, etc., active on device at time of reboot, among other examples. In additional examples, a more comprehensive trained AI model may focus on a larger number of parameters up to applying all of the listed parameters identified in the foregoing. Latency requirements and run-time scenarios may dictate what type of trained AI model to apply.

Moreover, contextual analysis executed by trained AI processing may further consider signal data collected from one or more resources. Signal data may be collectively analyzed to generate determinations described herein including those where the update estimation management component 106 and/or the component configured for implementation of trained AI processing 108 are executing importance/relevance scoring/ranking to automatically generate determinations described herein. For instance, application of a trained AI model (or models) may be trained to evaluate past and/or current user actions, user preferences, application/service log data, etc., associated with one or more computing devices and/or user accounts. Non-limiting examples of signal data that may be collected and analyzed comprises but is not limited to: device-specific signal data collected from operation of one or more user computing devices; user-specific signal data collected from specific tenants/user-accounts with respect to access to any of: login to a distributed software data platform, applications/services, etc.; application-specific data collected from usage of applications/services and associated endpoints; and/or a combination thereof. Analysis of such types of signal data in an aggregate manner may be useful in generating contextually relevant determinations, data insights, etc. Analysis of exemplary signal data may comprise identifying correlations and relationships between the different types of signal data, where telemetric analysis may be applied to generate determinations with respect to a contextual state of user activity with respect to one or more computing devices. For instance, a user may prefer to receive notifications through a specific OS GUI menu or host application/service endpoint as compared with other GUI menus and/or host application/service endpoints. In another technical instance, it may be determined that device usage patterns indicate that a user does not regularly use their computing device during certain time period. This type of analysis may be useful to generate suggestions as to when to apply an update to a computing device, relative to an update estimate.

In further examples, a relevance evaluation may be executed based on analysis of signal data to select a specific trained AI model for generation of an update estimate and/or other determinations. For instance, device-specific, user-specific and/or application-specific data may be analyzed to select one of a plurality of trained AI models with an aim to generate the most accurate update estimate. Among other factors, device configuration (e.g., one or more of hard drive type, RAM, processor) and/or geographical location data of a device/user may be evaluated to select a specific trained AI model to apply.

In some examples, a relevance scoring analysis is applied to identify targeted time periods for suggesting when to initiate automatic application of an update (including automatic initiation of one or more reboots) as applied to a computing device. Relevance scoring analysis may be generated based on analysis of any types of signal data previously described, including data associated with device usage patterns of a computing device. Data associated with device usage patterns may pertain to historical device usage patterns and/or current device usage of a user computing device (e.g., relative to historical device usage patterns) to generate a relevance determination. Relevance scoring may be comparatively evaluated to rank/prioritize time frames for suggesting when to apply an update. In some examples, a trained AI relevance model is generated and applied, separate from an AI model trained to generate an update estimate, where determinations and associated data may be shared between the two AI models to improve processing efficiency. In other examples, a trained AI update estimate model is adapted to generate suggestions of alternative time frames for executing automatic application of an update to a computing device (including one or more reboots).

In some examples, training an AI model includes application of a training algorithm. As an example, a decision tree (e.g., a Gradient Boosting Decision Tree) is used to train one or more exemplary AI models. Above what is traditionally known, an exemplary training algorithm focuses on the defined list of parameters for generating update estimates. In doing so, one or more types of decision tree algorithms can be applied for generating any number of decision trees to fine-tune a trained AI model. Some parameters for generation of update estimates are categorical and others may be continuous numbers. As such, additional processing operations may be applied to convert categorical parameters to a numerical representation including but not limited to: Gini, information gain and/or encoding, among other technical examples. An output result of a trained AI model may include a raw data value that is generated from any combination of update estimate parameters described above. An exemplary raw data value is a numerical representation that correlates with a time prediction for an update estimate. For instance, a raw data value may be 3.175, where that raw data value can be rounded up (or down in alternative instances) to provide a time prediction of three (3) minutes and eighteen (18) seconds.

As referenced in the foregoing description, knowledge repositories 110 may be accessed to manage data aiding operation of any other computer components of system 100.

Knowledge resources comprise any data affiliated with a software application platform (e.g., provided by Microsoft®, Google®, Apple®, IBM®) as well as data that is obtained from third-party applications/services. Knowledge repositories 110 may include resources accessible in a distributed manner via network connection and may be usable to improve processing operations described herein. Examples of data maintained by knowledge repositories 110 comprise but are not limited to: web resources (including cloud-based application/services); collected signal data (e.g., from usage of computing devices including retail devices and testing devices); data collected for training and update of trained AI modeling; telemetry data including past and present device usage of one or more computing devices; data for execution of application/services including host application/services and associated endpoints; corpuses of annotated data used to build and train AI processing classifiers for trained AI modeling; access to entity databases and/or other network graph databases usable for evaluation of signal data; web-based resources including any data accessible via network connection, such as data stored via distributed data storage; trained bots including those for natural language understanding; software modules and algorithms for contextual evaluation of content and metadata; and application/service data (e.g., data of applications/services managed by the application/service component 104) for execution of specific applications/services including electronic document metadata, among other examples. In even further examples, telemetry data may be collected, aggregated and correlated (e.g., by an interfacing application/service) to further provide components of system 100 with on demand access to telemetry data which can aid determinations generated thereby.

FIG. 2 illustrates an exemplary method 200 related to automatic generation and management of update estimates relative to one or more updates to be applied to a computing device, with which aspects of the present disclosure may be practiced. As an example, method 200 may be executed across an exemplary computing system 401 (or computing systems) as described in the description of FIG. 4. Exemplary components, described in method 200, may include hardware and/or software components, which are programmed to execute processing operations described herein. Non-limiting examples of components for operations of processing operations in method 200 are described in system 100. Processing operations performed in method 200 may correspond to operations executed by a system and/or service that executes computer modules/programs, software agents, application programming interfaces (APIs), plugins, AI processing including application of trained data models, intelligent bots, neural networks, transformers and/or other types of machine-learning processing, among other examples. In distributed examples, processing operations described in method 200 may be implemented by one or more computer components connected over a distributed network. For example, computer components may be executed on one or more network-enabled computing devices, connected over a distributed network, that enable access to user communications. It is further to be recognized that an order of execution of processing operations in method 200 may vary without departing from the spirit of the present disclosure. Furthermore, variations of method 200 may comprise execution of one or more of the processing operations identified in method 200 while omitting other processing operations, e.g., depending on a device and/or system that is executing processing.

Method 200 begins at processing operation 202, where trained AI modeling (e.g., one or more trained AI models) is generated that is adapted to generate determinations for one or more computing devices to which an update is to be applied. Generation and management of a trained AI model including training of one or more classifiers is known to one skilled in the field of art. Above what is traditionally known, processing operations are executed to adapt a trained AI model to generate update estimates. Exemplary processing operations for doing so have been described in the foregoing description including the description of system 100 (FIG. 1).

Training of AI processing may further comprise generating an AI model that is tuned to reflect specific metrics for accuracy, precision and/or recall before the trained AI model is exposed for real-time (or near real-time) usage. Developers may set thresholds for specific metrics to ensure that a trained AI model is operating as expected. Thresholds for metric evaluation of a specific trained AI model may vary, e.g., depending on developer specifications, without departing from the spirit of the present disclosure. As an example, thresholds may be set relative to an accuracy of an update estimate. As indicated in the foregoing description, a plurality of trained AI models may be generated and adapted to execute in specific contextual scenarios pertaining to identification of parameters associated with an update (e.g., including device characteristics).

Once a threshold (or thresholds) is met for exposing a trained AI model, flow of method 200 proceeds to processing operation 204. At processing operation 204, the trained AI modeling is exposed for real-time (or near real-time) evaluation of computing devices.

Flow of method 200 then proceeds to processing operation 206. At processing operation 206, one or more updates to be applied to a computing device (or computing devices) are identified. In one example, an update service is used to identify one or more updates to be applied to a specific computing device. For instance, an update service may be associated with a specific OS and/or distributed software platform. In another example, identification of one or more updates to apply occurs at a computing device which receives (e.g., from an update service). one or more updates to apply. As previously described, non-limiting examples of updates comprise but are not limited to: OS feature updates (e.g., new versions of an OS and/or integration of new features into an OS); and updates to applications/services, among other examples.

Flow of method 200 then proceeds to processing operation 208. At processing operation 208, the trained AI model is applied to generate an exemplary update estimate for one or more computing devices to which an update is to be applied. An update estimate is a temporal representation predicting an amount of time that is required to apply one or more updates to a computing device including one or more reboots of the computing device (e.g., to apply the update). An exemplary update estimate is generated based on a contextual analysis that evaluates one or more of: update parameters (associated with the update); device characteristics of the computing device to be updated; a state of current user activity on the computing device; historical predictions relating to prior update estimates for one or more computing devices (e.g., that comprise the computing device); or a combination thereof.

A trained AI model is applied that is adapted to generate an update estimate predicting an amount of time that is required to apply the update on the computing device. In some examples, the trained AI model is tailored for a specific user such that the trained AI model is customized for user device configuration for a specific user and/or related user engagement, behavior, preferences, etc. In another example, the trained AI model is tailored for group of users, for example, users of a particular geographical location and/or device configuration. In other examples, the trained AI model does not contemplate user-specific data but is applied based on device configuration data. As such, some examples of method 200 may comprise processing operations (e.g., processing operation 208) that select a specific trained AI model, from a plurality of available trained AI models. Processing to select a specific trained AI model may be executed by a programmed software module or a trained AI model that is adapted to analyze a specific user device configuration and related user engagement, behavior, preferences, etc., to select a tailored AI model to apply. In any technical instance, processing to select a specific version of a trained AI model occurs based on analysis of one or more parameters identified herein and/or types of signal data subsequently described.

During application of a trained AI model (e.g., a trained machine learning model), a plurality of parameters/features are described in the present disclosure that enable generating and providing an accurate update estimate and associated contextual information via GUI notification. In one example, such parameters include update parameters comprising: a type of the update; a size of the update; and/or other update parameters. Alternatively or additionally, the parameters may comprise device parameters indicating: a type of hard drive installed in the computing device; an age of the hard drive installed in the computing device; specifications associated with random access memory (RAM) installed in the computing device; specifications associated with a processor installed in the computing device; and/or other device parameters. Alternatively or additionally, the parameters may include user activity parameters indicating: applications and/or services currently executing on the computing device; a geographical identification of a location of the computing device; and/or other user activity parameters.

Method 200 then proceeds to processing operation 210. At processing operation 210, a notification (e.g., GUI notification) is automatically generated, where the notification comprises the update estimate. An exemplary notification is presentable through a GUI associated with a computing device, where a GUI may be specific to OS and/or a host application/service endpoint.

At processing operation 212, one or more data insights related to a generated update estimate are generated. In some technical instances, exemplary data insights are generated and included in an exemplary update estimate notification. In other technical instances, data insights may be generated and presented separately from the update estimate notification, for example, in a separate GUI notification that may be presented concurrently with or separately from the update estimate notification. Non-limiting visual examples of data insights are illustrated in FIGS. 3B-3D. In any example, a data insight provides context for the update estimate, including insight into the determinations generated through application of the trained AI model. In one example, a data insight indicates a rationale for the update estimate, including determinations from applicable parameters, identified by a trained AI model, that were used to predict the amount of time that is required to apply an update to the computing device. An exemplary length of time is a temporal representation (e.g., a prediction in minutes and/or seconds) indicating an estimation as to an amount of time that is required to apply one or more updates to a computing device including one or more reboots of the computing device (e.g., to apply the update). In other examples, a data insight indicates a user-specific context and/or device-specific context pertaining to a specific user/device. In some examples, the user-specific context and/or device-specific context may be presented relative to other users (e.g., a group of users in a geographical location of that user). Exemplary data insights further provide links to content/resources that may be related to the update estimate. For instance, a link to computing device upgrades may be provided to a user wherein the upgrades would improve efficiency in application of an update. In even further examples, data insights are generated that are derived from analysis of device usage patterns (e.g., of a computing device or group of computing devices), where suggestions can be provided to a user as to when to apply an update relative to the update estimate. For instance, if an update estimate predicts that application of an update will take ten minutes, a ten-minute window may be suggested to the user based on analysis of device usage patterns (e.g., for a user or group of users). Trained AI processing is further usable to generate suggested time windows for applying an update based on contextual analysis that comprises analysis of device usage (e.g., historic usage patterns and/or current usage).

An exemplary notification is then caused (processing operation 214) to be rendered on a computing device. In some examples, trained AI processing is executed in a distributed manner using resources that are separate from the computing device that is to be updated. In such technical instances, an exemplary notification is then transmitted to the computing device for rendering. In examples where data insights are separate from the notification of the update estimate, data insights are also transmitted to the computing device for rendering. In alternative examples, a trained AI model is stored and executed on a computing device in which an update is to be applied. In such technical instances, the notification and/or the contextual data insights are rendered in a GUI (e.g., of an OS) that is presented via a computing device (or peripheral display device). An exemplary notification is presented inline with OS content and/or content presented through a GUI of a host application/service endpoint. Inline, as referenced in the present disclosure, is intended to refer to technical instances where data is embedded as a content portion (data object), among other content portions, that is displayable within a rendering of OS content (OS GUI) or GUI of a host application/service endpoint. Non-limiting examples of content presented inline are illustrated in FIGS. 3B-3D. In further examples, an exemplary notification and/or data insights are propagated to other computing devices. For instance, a notification comprising an update estimate is propagated to another computing device registered to a user account associated with a user of the computing device.

Flow of method 200 then proceeds to decision operation 216. At decision operation 216, it is determined whether a change to a state of user activity of a computing device has been detected. This processing may comprise evaluating signal data pertaining to usage of the computing device. The trained AI model is configured to provide real-time (or near real-time) analysis to continuously or periodically update the update estimate. User engagement with a computing device can impact the time prediction of an update estimate. For example, a user may have shut down (or exited out of) applications/services, which may impact the time it takes for a computing device to shut down to complete application of an update (including one or more reboots). Alternatively or additionally, a device configuration and/or related settings through an OS may be modified, which may impact the update estimate. In examples where no change is detected to a state of current user activity on a computing device, flow of decision operation 216 branches "NO" and method 200 remains idle until a change is detected and subsequent processing is to be executed. When a change to the state of current user activity of the computing device is detected, flow of decision operation 216 branches "YES" and processing of method 200 proceeds to processing operation 218.

At processing operation 218, an updated estimate (e.g., second update estimate) is generated, using the trained AI model. The updated estimate is then either presented via a computing device or transmitted to the computing device for rendering. This process can be repeated until an update is applied manually by a user or automatically by a system/computing device. Method 200 may then return back to processing operation 206, when a new update to be applied is detected/identified.

FIGS. 3A-3D illustrate exemplary user interface views adapted for management of update estimates relative to one or more updates to be applied to a computing device, with which aspects of the present disclosure may be practiced. FIGS. 3A-3D provide non-limiting front-end examples of processing described in the foregoing including system 100 and method 200 (FIG. 2).

FIG. 3A presents user interface view 300, illustrating a GUI 302 of an OS (e.g., MICROSOFT® WINDOWS®). As previously described, an OS may continuously or periodically be updated to provide an improved user experience. Traditionally, information about updates to be applied is presented via GUI notifications in a variety of forms. Among other examples, a notification of an update to be applied can be presented based on selection of a feature in a GUI menu. Non-limiting examples of GUI menus comprise but are not limited to: a power/shut-down feature menu of a device that is presented in a taskbar of a GUI menu (e.g., a startup menu); a GUI feature menu (e.g., linked to an update application/service) that identifies a state of updates applied to a computing device; and/or a GUI feature menu configured for management of GUI notifications (e.g., across user accounts and/or services of a software data platform). However, the present disclosure is applicable to provide update estimates and associated data insights across GUI notifications for any application/service (e.g., host application/service endpoint).

In the non-limiting example shown in user interface view 300, GUI 302 is presented showing a user interacting with a startup menu of an OS. A user action 304 is received selecting a startup menu icon 306, which automatically presents GUI menu 308. GUI menu 308 presents non-limiting examples of GUI features associated with a startup menu, providing a variety of application/services and/or features associated with an OS representation. In user interface view 300, a second user action 310 is received selecting a GUI icon 312 configured to control, via the OS, a power state of a computing device. For instance, a user may select the GUI icon 312 to shut-down a computing device, place the computing device in a sleep/hibernate mode, control a lock state of the computing device, and/or control restart of a computing device, among other examples. As a user may typically select a GUI icon 312 configured to control a power state of a computing device when the user wishes to initiate a shut-down or restart, this may include automatically presenting a GUI notification 314 associated with an update estimate. While some examples may automatically present GUI notification 314 when the user executes an action (e.g., selection or hover action) with respect to a GUI icon configured to control a power state, in other examples a GUI notification 314 is presented when the user further interacts with GUI features/elements within a GUI submenu (not pictured) associated with control of a power state of a computing device.

In any example, GUI notification 314 is presented to a user through the GUI of an OS. GUI notification 314 provides an update estimate 316 identifying a temporal representation (eighteen minutes in the illustrated example) indicating an estimation as to an amount of time that is required to apply the update on the computing device. GUI notification 314 further provides additional GUI features to aid user control over application of an update to a computing device. For instance, user interface view 300 illustrates a GUI icon 318 configured to provide additional information about the update estimate 316. If a user selects GUI icon 318, as shown in FIG. 3A, additional information about the update estimate 316 is presented through the GUI of the OS. Other GUI features are also presented in GUI notification 314 to enable user control over initiation of an update, including a GUI feature 315A configured to enable a user to select a preferred time for application of an update; GUI feature 315B configured to enable a user to automatically initiate a future notification ("Remind me later") for application of the update to the computing device; and GUI feature 315C configured to enable a user to instantly apply an update (e.g., automatically initiate a restart/reboot that applies an update).

FIG. 3B presents user interface view 320, illustrating a continued example of processing from that shown in user interface view 300 (FIG. 3A). User interface view 320 illustrates a receipt of a user action 322, selecting, through the GUI 302, a GUI icon 318 configured to provide additional information about the update estimate 316. In response to a receipt of user action 322, a non-limiting example of a data insight notification 324 is automatically presented through the GUI 302. The data insight notification 324 provides context for the update estimate 316 (FIG. 3A) including data insights correlated from application of trained AI processing (e.g., a trained machine learning model) used to generate the update estimate 316. For instance, a first data insight 326 is presented in data insight notification 324 that identifies factors (parameters), identified by a trained AI model, that impacted the temporal estimate presented as part of the update estimate 316. As a non-limiting example, factors that resulted in an update estimate 316 being eighteen (18) minutes in the illustrated example comprise: the type of update; the type of hard drive installed on a computing device; the RAM installed on the computing device; the processor installed on the computing device; and the number of applications/services currently active on the computing device.

Additionally, data insight notification 324 presents a second data insight 328 providing device-specific analysis related to the update estimate 316. The device-specific analysis, provided in the second data insight 328, identifies specifics about the device configuration of the computing device that contributed to a longer update estimate as compared with other similar device configurations. As an example, a comparative evaluation is described between a user's computing device and computing devices of other users. For instance, a hard drive on the illustrated computing device is two years older (on average) than similar device configurations of other users (e.g., of a software data platform) and likely much more fragmented. This results in a longer update estimate 316, having a delta of three (3) minutes, as compared with other users having similar device configurations. This type of rationale may help users identify if a device configuration can be upgraded to improve performance. Exemplary data insight notification 324 may also comprise a link 330 to hard drive upgrades that the user may consider for improving performance of his computing device.

FIG. 3C presents user interface view 340, illustrating a continued example of processing from that shown in processing device view 300 (FIG. 3A). In the example shown in user interface view 340, data insights, relative to an update estimate, are provided to a user to help the user schedule an alternative time for initiating an update to a computing device. Exemplary data insights are provided as a result of the application of trained AI processing that is adapted to generate determinations related to update estimates. In the example shown in user interface view 340, a GUI icon 315A (FIG. 3A) of the GUI notification 314 (FIG. 3A) is presented that enables a user to select an alternative time to apply an update to a computing device. A user action 342 is shown that selects GUI icon 315A, which, in some examples, automatically triggers presentation of data insight notification 344. Data insight notification 344 comprises a first data insight 346 that comprises an insight derived from analysis of device usage patterns of the computing device, where the insight identifies a time period which may be preferred to apply an update (e.g., if a user does not wish to reboot their device at that current time).

Data insight notification 344 further comprises a second data insight 348 that suggests a specific time frame, within the period of time identified in the first data insight 346, to apply the update. Data insight notification 344 further comprises GUI features 350 that enable a user to confirm whether they would like to automatically apply the suggestion for when to initiate application of an update or select a new (alternative) time to initiate application of an update. Again, historical device usage patterns can be analyzed to identify preferred time periods of time and/or specific time frames within said periods of time. In some examples, a relevance scoring analysis is applied to identify preferred time periods (and time frames within said periods of time) previously referenced. Relevance scoring analysis may be generated based on analysis of signal data previously described including data associated with device usage patterns of a computing device. Data associated with device usage patterns may pertain to historical device usage patterns and/or current device usage of a user computing device (e.g., relative to historical device usage patterns) to generate a relevance determination. Relevance scoring may be comparatively evaluated to rank/prioritize potential time frames for suggesting when to apply an update.

FIG. 3D presents user interface view 360, illustrating an example notification 362 (push notification), identifying an update estimate 364 that is rendered on a different computing device from which an update is to be applied. For instance, notification 362 is rendered on a display integrated in (or connected to) a user computing device that is associated with a user account, where the user account may be associated with a plurality of user computing devices. That is, user interface view 360 is intended to address a technical instance where multiple user computing devices are associated with a user account (e.g., of a software data platform). An update may be ready to be applied to one user computing device while the user is working on different user computing device. In processing device view 360, the notification 362 is rendered in a GUI of an OS of a tablet computing device that is associated with a user account in which an update is to be applied to a different computing device also associated with the user account. The notification 362 further comprises a first GUI feature 366 that is configured to automatically apply the update to the other user computing device. By selecting GUI feature 366, a user can remotely control initiation of application of an update update to a different computing device. Further, notification 362 further comprises a set of GUI features 368 that enable a user to set a reminder for applying the update and/or reschedule the application of the update. In this way, a user can further remotely control actions with respect to a notifications of update estimates.

A contextual analysis may be executed to determine how/when to send notifications (push notifications) to different user computing devices. Said contextual analysis may comprise analyzing signal data, previously referenced, to generate determinations as to when/how to propagate notifications to user computing devices (e.g., in addition to providing a notification to a user computing device that is to be updated). In one example, a contextual analysis may comprise analysis of user preferences for receiving notifications across devices of a user account. In further technical instances, relevance scoring is generated to identify target user computing devices that will receive an exemplary notification, where relevance scoring is generated based on analysis of any types of signal data, previously described, including data associated with device usage patterns of a computing device. Data associated with device usage patterns may pertain to historical device usage patterns and/or current device usage of a user computing device (e.g., relative to historical device usage patterns) to generate a relevance determination. Relevance scoring may be comparatively evaluated to determine how/where to propagate a notification. In some examples, a trained AI model is generated and applied, separate from a trained AI model that is adapted to generate update estimates, where determinations and associated data may be shared between the two AI models to improve processing efficiency.

Figure 4:
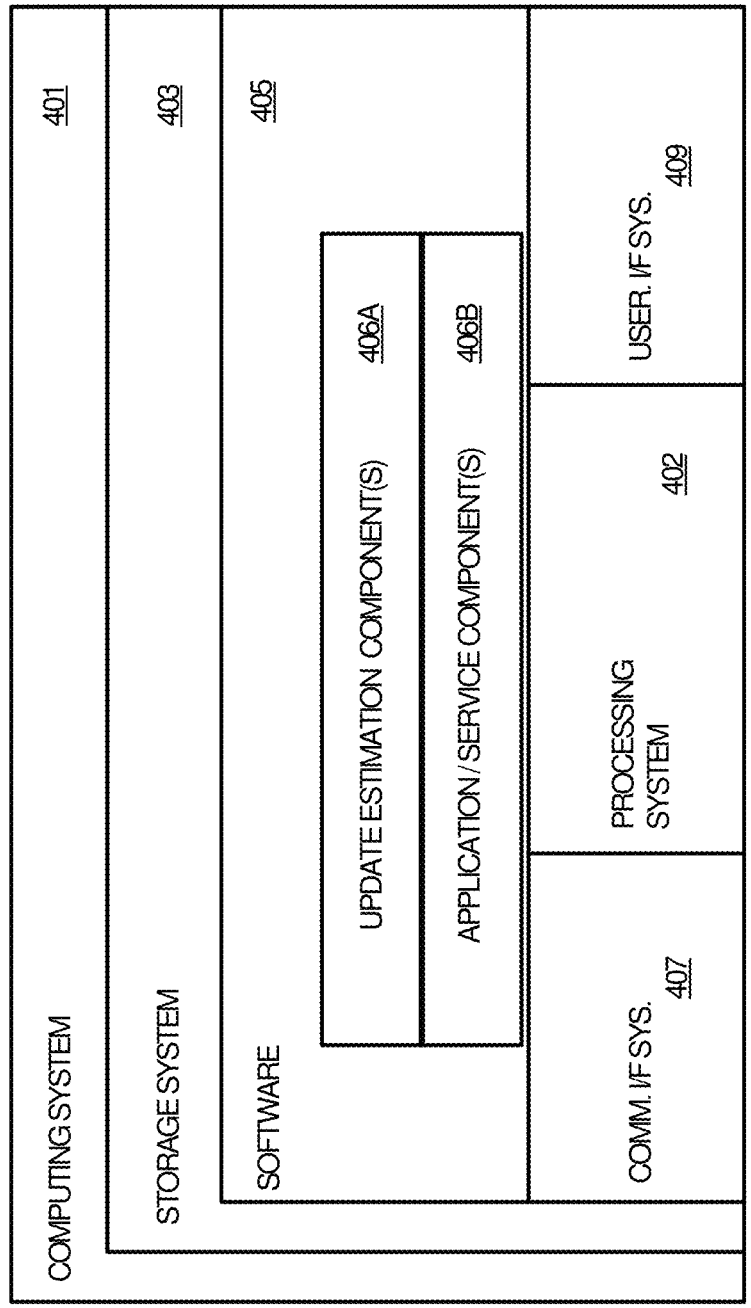
FIG. 4 illustrates a computing system suitable for implementing processing operations described herein related to generation and management of update estimates relative to application of one or more updates to a computing device, with which aspects of the present disclosure may be practiced.

FIG. 4 illustrates a computing system 401 suitable for implementing processing operations described herein related to generation and management of update estimates relative to application of one or more updates to a computing device, with which aspects of the present disclosure may be practiced. As referenced above, computing system 401 may be configured to implement processing operations of any component described herein including exemplary components previously described in system 100 (FIG. 1). As such, computing system 401 may be configured to execute specific processing operations to solve the technical problems described herein, which comprise processing operations for intelligent and timely notifications of update estimates related to one or more updates to be applied to a computing device. This processing further extends to generation of data insights (e.g., that accompany notifications of update estimates), where data insights provide contextual understanding of update estimates, trained AI processing and further synergize with other resources (e.g., applications/services, content, links to device upgrades to improve efficiency during update installation/reboot). Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/ services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406A-D) that are configured to enable functionality described herein. In some examples, computing system 401 may be connected to other computing devices (e.g., display device, audio devices, servers, mobile/ remote devices, gaming devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system 100 (FIG. 1), processing operations described in method 200 (FIG. 2) and/or the accompanying description of FIGS. 3A-3D.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing an update estimation component 406a; and an application/service component 406b, as described herein. In further examples, software may comprise program instructions for executing a separate component for implementation of a programmed software module and/or trained AI processing though in other instances a programmed software module and/or trained AI processing may be executed by one of the other components of system 100 in combination with one or more computing systems 401.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: an improved GUI providing automatic generation of notifications of update estimates; generation and management of contextual data insights related to update estimates including rationale supporting results from application of trained AI processing; and providing notifications through different host applications/service endpoints (e.g., via GUI elements, OS notifications and/or inline with content), among other examples. User interface system 409 comprises a graphical user interface that presents graphical user interface elements representative of any point in the processing described in the foregoing description including processing operations described in system 100 (FIG. 1), method 200 (FIG. 2) and front-end representations related to the description of FIGS. 3A-3D. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Some non-limiting examples of the present disclosure describe systems and/or method for managing automated notifications of update estimates relative to updates to be applied to a computing device. For instance, a computer-implemented method may be executed across at least one computing device, including a system, to accomplish processing described herein.

In one non-limiting example, one or more updates to be applied to a computing device are identified. Non-limiting examples of updates comprise but are not limited to: OS feature updates (e.g., new versions of an OS and/or integration of new features into an OS); OS updates; and updates to applications/services, among other examples. A trained AI model adapted to generate an update estimate is applied. An update estimate is a temporal representation predicting an amount of time that is required to apply one or more updates to a computing device including one or more reboots of the computing device (e.g., to apply the update). An exemplary update estimate is generated based on a contextual analysis that evaluates one or more of: parameters associated with the update; device characteristics of the computing device to be updated; a state of current user activity on the computing device; historical predictions relating to prior update estimates for one or more computing devices (e.g., that comprise the computing device); or a combination thereof. A notification (e.g., graphical user interface (GUI) notification) is automatically generated, where the notification comprises: the update estimate and/or contextually relevant data insights pertaining to the update estimate which may be generated based on determinations derived from a trained AI model. An exemplary notification is then caused to be rendered. In some examples, an exemplary notification may be transmitted to a client computing device for rendering. In other examples, an exemplary notification is rendered via a computing device that generated the notification.

In some examples, an AI model (e.g., machine learning model) is trained based on one or more of the following data types: retail device data from a user population of retail computing devices associated with a software data platform (e.g., executing a specific OS or group of OS iterations); testing device data from computing devices in a software testing program; and a corpus of training data comprising feedback on update estimates from prior iterations of a trained AI model. In some examples, a trained AI model that is applied is tailored for a specific user where a trained model customized for user device configuration and related user engagement, behavior, preferences, etc. In another example, a trained AI model that is applied is tailored for group of users, for example, users of a geographical location and/or device configuration. In other examples, an exemplary trained AI model does not contemplate user-specific data and is tailored strictly on device configuration data.

Diving deeper into the contextual analysis executed by the trained AI model, a plurality of parameters/features are described in the present disclosure that enable a comprehensive contextual analysis to be executed so that an accurate update estimate (and context) can be generated and provided via GUI notification. In one example, the parameters associated with the update, that are analyzed in the contextual analysis, comprise: a type of the update and a size of the update. In another example, the device characteristics, that are analyzed in the contextual analysis, comprise device parameters indicating: a type of hard drive installed in the computing device; an age of the hard drive installed in the computing device; specifications associated with RAM installed in the computing device, and specifications associated with a processor installed in the computing device. In yet another example, the state of current user activity on the computing device, that is analyzed in the contextual analysis, comprises user activity parameters indicating: applications and/or services currently executing on the computing device; and geographical identification of a location of the computing device.

Furthermore, a notification (e.g., GUI notification) is automatically generated, where the notification comprises the update estimate. An exemplary notification is presentable through a GUI associated with a computing device, where a GUI may be specific to OS and/or a host application/service endpoint. In further examples, an exemplary notification comprises one or more data insights providing context for the update estimate. In alternative examples, one or more data insights are generated separate from a notification of an update estimate but is surfaced concurrently therewith. In any example, a data insight provides context for the update estimate including insight into the determinations generated through application of the trained AI model. In one example, a data insight provides content indicating a rationale supporting the update estimate including key parameters (identified by a trained AI model) that were used to predict an amount of time that is required to apply the update on the computing device. In other examples, a data insight provides content indicating user-specific context and/or device-specific context pertaining to a specific user/device and even relative to other users (e.g., group of users in a geographical location of that user). Exemplary data insights further provide links to content/resources that are related to the update estimate. For instance, a link to computing device upgrades can be provided to a user which may impact efficiency in application of an update. In even further examples, data insights are generated that are derived from analysis of device usage patterns (e.g., of a computing device or group of computing devices), where suggestions can be provided to a user as to when to apply an update relative to the update estimate.

In some examples, trained AI processing is executed in a distributed manner using resources that are separate from the computing device that is to be updated. In such technical instances, an exemplary notification is then transmitted to the computing device for rendering. In examples where data insights are separate from the notification of the update estimate, data insights are also transmitted to the computing device for rendering.

In alternative examples, a trained AI model is stored and executed on a computing device in which an update is to be applied. In such technical instances, the notification and/or the contextual data insights are rendered in a GUI (e.g., of an application/service) that is presented via a computing device (or peripheral display device). An exemplary notification is presented inline with OS content and/or content presented through a GUI of a host application/service endpoint. Inline, as referenced in the present disclosure, is intended to refer to technical instances where data is embedded as a content portion (data object), among other content portions, that is displayable within a rendering of OS content (OS GUI) or GUI of a host application/service endpoint. Non-limiting examples of content presented inline are illustrated in FIGS. 3B-3D. In further examples, an exemplary notification and/or data insights are propagated to other computing devices. For instance, a notification comprising an update estimate is propagated to another computing device registered to a user account associated with a user of the computing device.

Additionally, the trained AI model is configured to provide real-time (or near real-time) analysis to continuously update the update estimate. For instance, user engagement with a computing device can impact the time of an update estimate. In one example, a change to the state of current user activity of the computing device is detected. In response, an updated estimate (e.g., second update estimate) is generated, using the trained AI model. The updated estimate is then either presented via a computing device or transmitted to the computing device for rendering.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
identifying an update to be applied to a computing device;
applying a trained artificial intelligence (AI) model that is adapted to generate an update estimate predicting an amount of time that is required to apply the update on the computing device, wherein the update estimate is generated based on a contextual analysis that evaluates:
parameters associated with the update,
device characteristics of the computing device, and
a state of current user activity comprising user activity parameters that indicate applications currently executing on the computing device and a geographical identification of a location of the computing device;
generating a notification that comprises the update estimate; and
causing the notification to be rendered for the computing device.

2. The computer-implemented method of claim 1, wherein the parameters associated with the update, that are evaluated in the contextual analysis, comprise: a type of the update and a size of the update.

3. The computer-implemented method of claim 1, wherein the device characteristics, that are evaluated in the contextual analysis, comprise device parameters indicating: a type of hard drive installed in the computing device; an age of the hard drive installed in the computing device; specifications associated with random access memory (RAM) installed in the computing device; and specifications associated with a processor installed in the computing device.

4. The computer-implemented method of claim 1, wherein the contextual analysis, used to generate the update estimate, further evaluates: historical predictions relating to prior update estimates for one or more computing devices that comprise the computing device.

5. The computer-implemented method of claim 1, wherein the trained AI model is trained based on: retail device data from a user population of retail computing devices associated with a software data platform; and a corpus of training data comprising feedback on update estimates from prior iterations of the trained AI model.

6. The computer-implemented method of claim 1, further comprising: generating a data insight providing a content indicating a rationale supporting the update estimate including parameters that were used to generate a prediction indicating the amount of time that is required to apply the update on the computing device; and transmitting the data insight to the computing device for rendering.

7. The computer-implemented method of claim 1, further comprising: detecting a change to the state of current user activity of the computing device; generating, using the trained AI model, a second update estimate; and transmitting the second update estimate to the computing device.

8. A system comprising:
at least one processor; and
a memory, operatively connected with the at least one processor, storing computer-executable instructions that, when executed by the at least one processor, causes the at least one processor to execute a method that comprises:
identifying an update to be applied to a computing device;
applying a trained artificial intelligence (AI) model that is adapted to generate an update estimate predicting an amount of time that is required to apply the update on the computing device, wherein the update estimate is generated based on a contextual analysis that evaluates:
parameters associated with the update,
device characteristics of the computing device, and
a state of current user activity comprising user activity parameters that indicate applications currently executing on the computing device and a geographical identification of a location of the computing device;
generating a notification that comprises the update estimate; and
causing the notification to be rendered for the computing device.

9. The system of claim 8, wherein the parameters associated with the update, that are evaluated in the contextual analysis, comprise: a type of the update and a size of the update.

10. The system of claim 8, wherein the device characteristics, that are evaluated in the contextual analysis, comprise device parameters indicating: a type of hard drive installed in the computing device; an age of the hard drive installed in the computing device; specifications associated with random access memory (RAM) installed in the computing device; and specifications associated with a processor installed in the computing device.

11. The system of claim 8, wherein the contextual analysis, used to generate the update estimate, further evaluates: historical predictions relating to prior update estimates for one or more computing devices that comprise the computing device.

12. The system of claim 8, wherein the trained AI model is trained based on: retail device data from a user population of retail computing devices associated with a software data platform; and a corpus of training data comprising feedback on update estimates from prior iterations of the trained AI model.

13. The system of claim 8, wherein the method, executed by the at least one processor, further comprises: generating a data insight providing a content indicating a rationale supporting the update estimate including parameters that were used to generate a prediction indicating the amount of time that is required to apply the update on the computing device; and transmitting the data insight to the computing device for rendering.

14. The system of claim 8, wherein the method, executed by the at least one processor, further comprises: detecting a change to the state of current user activity of the computing device; generating, using the trained AI model, a second update estimate; and transmitting the second update estimate to the computing device.

15. A computer-implemented method comprising:

identifying an update to be applied to a computing device;

applying a trained artificial intelligence (AI) model that is adapted to generate an update estimate predicting an amount of time that is required to apply the update on the computing device, wherein the update estimate is generated based on a contextual analysis that evaluates:

parameters associated with the update, device characteristics of the computing device, and a state of current user activity comprising user activity parameters that indicate applications currently executing on the computing device and a geographical identification of a location of the computing device;

generating a notification that comprises the update estimate; and causing the notification to be rendered in a graphical user interface (GUI) executing on the computing device.

16. The computer-implemented method of claim 15, further comprising: propagating the notification to another computing device registered to a user account associated with a user of the computing device.

17. The computer-implemented method of claim 15, wherein the parameters associated with the update, that are evaluated in the contextual analysis, comprise: a type of the update and a size of the update.

18. The computer-implemented method of claim 15, further comprising: generating a data insight providing a content indicating a rationale supporting the update estimate including parameters that were used to generate a prediction indicating the amount of time that is required to apply the update on the computing device; and rendering the data insight in the GUI.

19. The computer-implemented method of claim 15, wherein the device characteristics, that are evaluated in the contextual analysis, comprise device parameters indicating: a type of hard drive installed in the computing device, an age of the hard drive installed in the computing device, specifications associated with random access memory (RAM) installed in the computing device, and specifications associated with a processor installed in the computing device.

20. The computer-implemented method of claim 15, wherein the state of current user activity on the computing device, that is evaluated in the contextual analysis, comprises user activity parameters indicating: applications and/or services currently executing on the computing device, and geographical identification of a location of the computing device.

* * * * *